K. S. BAXTER.
MOTOR TRUCK SEAT.
APPLICATION FILED JULY 2, 1918. RENEWED JUNE 16, 1919.
1,311,146.
Patented July 22, 1919.
2 SHEETS—SHEET 1.
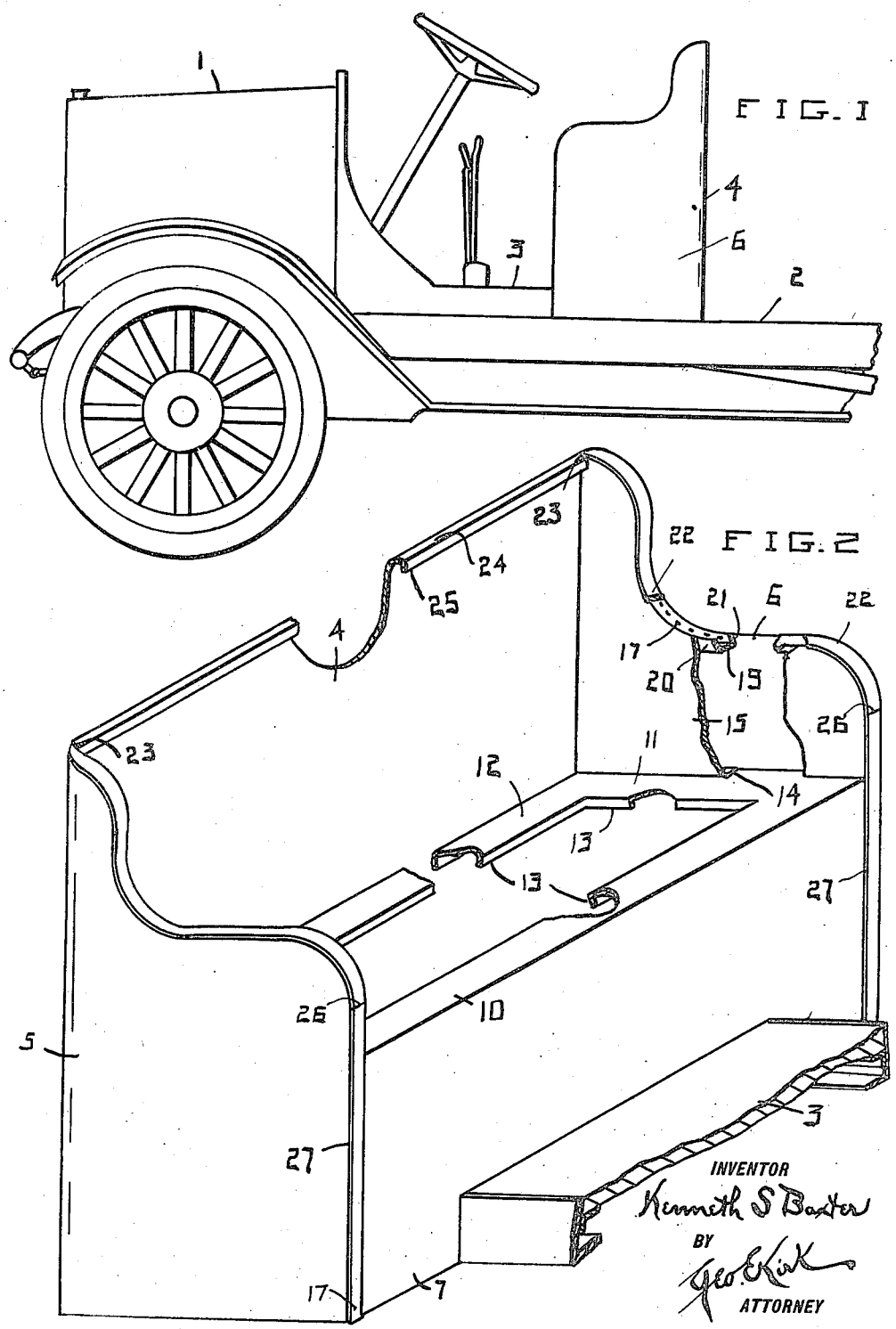
INVENTOR
Kenneth S Baxter
BY
Geo. E. Kirk
ATTORNEY

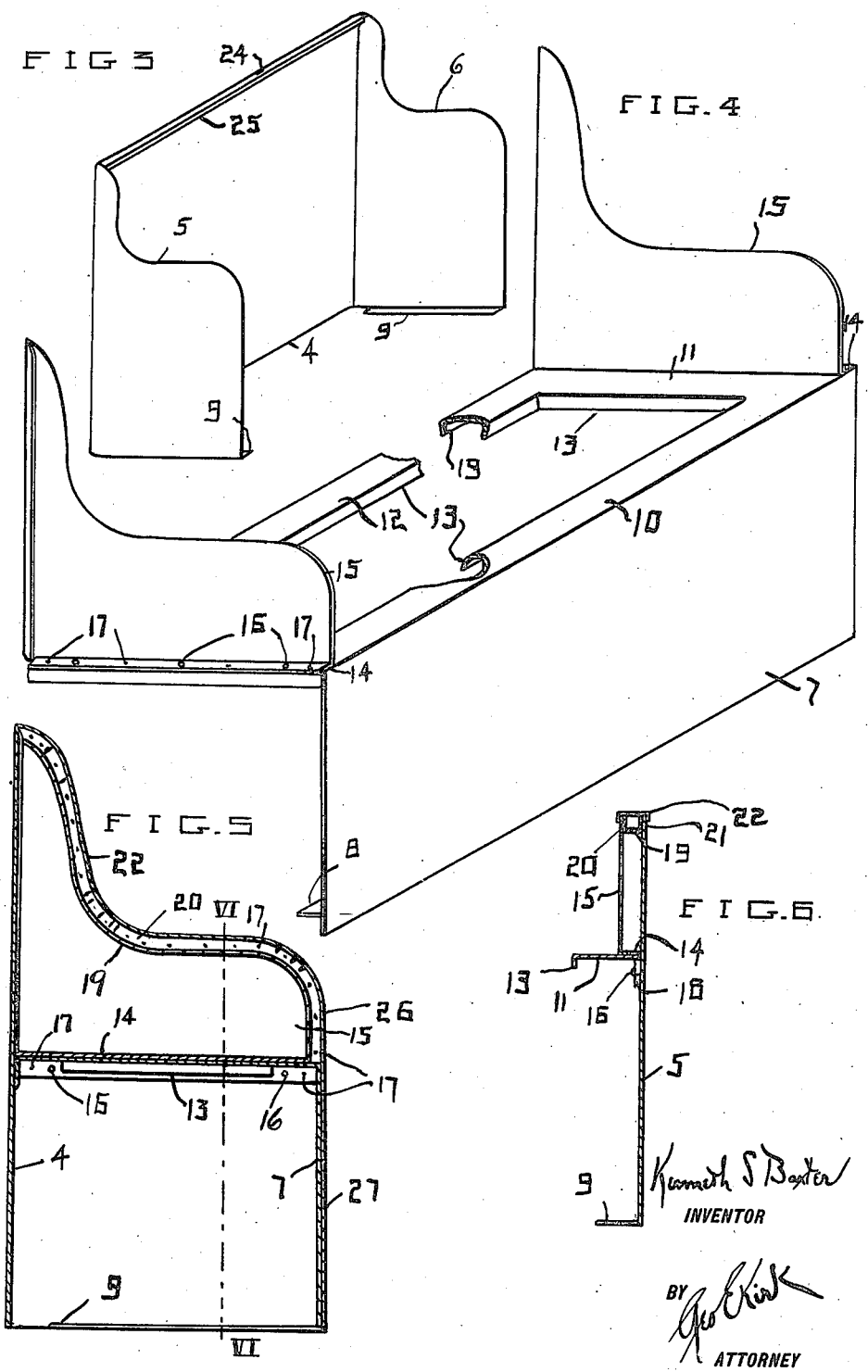

UNITED STATES PATENT OFFICE.

KENNETH S. BAXTER, OF BRYAN, OHIO, ASSIGNOR TO THE SHEET STEEL PRODUCTS COMPANY, OF BRYAN, OHIO, A CORPORATION OF OHIO.

MOTOR-TRUCK SEAT.

1,311,146. Specification of Letters Patent. Patented July 22, 1919.

Application filed July 2, 1918, Serial No. 243,057. Renewed June 16, 1919. Serial No. 304,727.

*To all whom it may concern:*

Be it known that I, KENNETH S. BAXTER, a citizen of the United States of America, residing at Bryan, Williams county, Ohio, have invented new and useful Motor-Truck Seats, of which the following is a specification.

This invention relates to motor vehicle equipment details.

This invention has utility when incorporated in motor trucks or freight handling vehicles, especially in providing a substantial light weight and sightly seat and driver's station on the chassis.

Referring to the drawings:

Figure 1 is a fragmentary view of a motor truck having the station or seat of the invention herein incorporated therewith;

Fig. 2 is a perspective view, with parts broken away of the seat of Fig. 1;

Fig. 3 is a perspective view of the main or three sided supporting vertical wall of U-form for the seat;

Fig. 4 is a perspective view of the front supporting wall for the seat with the seat carrying ledges, with the inner walls of the seat arms mounted thereon, portions being broken away;

Fig. 5 is a section from front to rear through a seat arm; and

Fig. 6 is a section on the line VI—VI, Fig. 5.

The motor vehicle 1 has the chassis or truck frame 2 upon which is mounted the driver's station 3, in this instance a light gage sheet metal structure providing a seat. This seat is shown as having the back or main vertical supporting wall 4 with forwardly extending portions 5, 6, therefrom, together forming a U-shaped single sheet of metal.

In assembling the station structure to form or provide the seat, the front supporting sheet metal wall 7 may upwardly extend from its rearwardly extending base portion angle or flange 8 adjacent base flanges 9 of the sides 5, 6 (Figs. 3, 5). The upper portion of the wall 7 may be bent inwardly to form the forward ledge means 10 for carrying the upholstered seat proper. In this instance the sheet metal ledge means 11, 12, completing the seat carrying rectangle, are shown as extensions from the ledge 10, and are further stiffened by inner downwardly extending flanges 13.

Upon the ledges 11, outwardly extending base flanges 14 of inner walls 15 are mounted by rivets 16 and spot welds 17. This assembly (Fig. 4) is ready for grouping with the formed three sided vertical wall 4, 5, 6 (Fig. 3) by rivets 16 and spot welds 17 from ledge flanges 18. Access for the welding and riveting is readily obtained through the rectangular opening formed by the ledges 10, 11, 12, for the cushion or upholstered seat proper.

Between the parallel walls 5, 15, and 6, 15, forming the double walls for seat arms, there is now inserted channel 19, with its legs outwardly extending to approximate conforming to the curvature of the seat arm. As this channel 19 is to be concealed, it may be of a gage to give reinforcing strength, and still readily bent to the form of the arm top by cutting or notching the outwardly extending legs of this channel. The electric spot welder brings about firm union between leg 20 of the channel 19 and the inner wall 15, while spot welds 17 also unite leg 21 of the channel 19 to the opposing outer wall 5, or 6. The distance apart of the welds may be such as found desirable in the building of a structure to resist the shocks and strains, together with hard usage of heavy load handling vehicles. Over this outwardly open channel and the edges of the upstanding parallel walls is fitted the short legged light gage finish channel 22, having at the upper end acetylene weld union 23 with the overhang 24 from the back 4, which has a short downward flange 25 affording a holding mounting for the back cushion or upholstery for the seat. The lower forward end of the finish shield or channel 22 has acetylene weld 26 to a vertical corner finish strip 27. As so built, arm cushions are not needed.

Light gage steel may be used throughout, with a maximum of strength and rigidity. Variation in form without die expense can be had, as ready manufacture by breaking or folding may be economically conducted. In the weld assembly as described, there is at once an acceptable finished article, with no rough portions to be removed.

What is claimed and it is desired to secure by Letters Patent is:

1. A structure for mounting on a vehicle frame to provide a driver's station, embodying a continuous U-shaped vertical wall, means providing a ledge mounted upon and disposed within the parallel legs of the U-wall for a seat, and means providing an inner wall mounted on the ledge and upwardly extending adjacent the leg portions of the U-wall to form therewith seat arms.

2. A sheet metal vehicle seat embodying a back having a wall continuous therefrom to form a side for a seat arm, a sheet metal wall-forming member parallel to said seat arm side to form a second seat arm side, a channel disposed between said seat arm sides and anchored thereto as a reinforcement therefor, and an outer channel inclosing the reinforcing channel and embracing the seat arm sides to terminate on the parallel walls thereof and anchored thereto.

3. A sheet metal vehicle seat embodying an upstanding supporting leg-forming wall, a ledge intermediate the height of said wall, a second parallel wall mounted on said ledge, a reinforcing channel coacting with said walls remote from said ledge, and a second channel having its flanges terminate on the parallel portions of said walls, said channel embracing said walls and anchored thereto.

4. A seat embodying single thickness supporting walls, ledge means inwardly extending therefrom to stiffen said walls and provide seat holding means, inner walls having outwardly extending base flanges mounted on the ledge means, said supporting walls extending above the ledge means on three sides, and finish means for the upper portions of the terminal sides of the supporting walls with said inner walls to provide seat arms.

5. A seat support embodying a three sided single thickness vertical wall, ledge means intermediate the height thereof for a seat, inner walls oppositely mounted on the ledge means and upwardly extending parallel with the terminal sides of the vertical wall, channel reinforcing means between the inner walls and the vertical wall sides, and a finish shield therefor to form seat arms.

In witness whereof I affix my signature.

KENNETH S. BAXTER.